(12) United States Patent
Teixeira et al.

(10) Patent No.: US 11,566,604 B2
(45) Date of Patent: Jan. 31, 2023

(54) TOOL, INSTALLATION ASSEMBLY, AND METHOD FOR POSITIONING A WIND TURBINE BLADE

(71) Applicant: National Oilwell Varco Norway AS, Kristiansand S (NO)

(72) Inventors: Anibal B. Teixeira, Kristiansand (NO); Ole Petter Torvik, Kristiansand (NO); Thor Strand, Kristiansand (NO)

(73) Assignee: National Oilwell Varco Norway AS, Kristiansand S (NO)

( * ) Notice: Subject to any disclaimer, the term of this patent is extended or adjusted under 35 U.S.C. 154(b) by 31 days.

(21) Appl. No.: 17/044,929

(22) PCT Filed: Apr. 12, 2019

(86) PCT No.: PCT/NO2019/050084
§ 371 (c)(1),
(2) Date: Oct. 2, 2020

(87) PCT Pub. No.: WO2019/203659
PCT Pub. Date: Oct. 24, 2019

(65) Prior Publication Data
US 2021/0293222 A1 Sep. 23, 2021

(30) Foreign Application Priority Data
Apr. 16, 2018 (NO) .................................. 20180521

(51) Int. Cl.
*F03D 13/10* (2016.01)
(52) U.S. Cl.
CPC ........ *F03D 13/10* (2016.05); *F05B 2230/608* (2013.01); *F05B 2240/916* (2013.01)

(58) Field of Classification Search
CPC .............. B66C 1/108; F05B 2240/916; F05B 2230/608; F05B 2230/61; F03D 13/10; F03D 1/6058
See application file for complete search history.

(56) References Cited

U.S. PATENT DOCUMENTS

| | | | |
|---|---|---|---|
| 2010/0150684 A1* | 6/2010 | Pedersen | F03D 13/20 414/800 |
| 2012/0308338 A1 | 12/2012 | Von Ahn | |
| 2016/0354879 A1 | 12/2016 | Gabeiras et al. | |

FOREIGN PATENT DOCUMENTS

| | | |
|---|---|---|
| DK | 2344752 T3 | 3/2014 |
| EP | 2616670 A1 | 7/2013 |

(Continued)

OTHER PUBLICATIONS

Norwegian Patent Application No. 20180521 Search Report dated Nov. 14, 2018 (2 pages).

(Continued)

*Primary Examiner* — Moshe Wilensky
(74) *Attorney, Agent, or Firm* — Conley Rose, P.C.

(57) ABSTRACT

Described is a tool and apparatus for positioning a blade for a wind turbine the wind turbine including a tower and a rotatable hub on the tower. The tool is mounted on a side of the tower so that the blade is supported on the tower in an initial configuration. The tool includes a first part arranged to be angularly movable relative to a second part for tilting the blade with respect to the tower to position the blade in a position that can allow the blade to be connected to the hub.

12 Claims, 4 Drawing Sheets

(56) References Cited

FOREIGN PATENT DOCUMENTS

| | | |
|---|---|---|
| EP | 2616670 B1 | 10/2015 |
| GB | 2483677 A | 3/2012 |
| JP | H06257555 A | 9/1994 |
| KR | 101346176 B1 | 12/2013 |
| KR | 20140001703 A | 1/2014 |
| KR | 20140001704 A | 1/2014 |
| WO | 2008/132226 A1 | 11/2008 |
| WO | 2012/034565 A1 | 3/2012 |

OTHER PUBLICATIONS

International Patent Application No. PCT/NO2019/050084 International Search Report and Written Opinion dated Jul. 9, 2019 (10 pages).
International Patent Application No. PCT/NO2019/050084 International Preliminary Report on Patentability dated Sep. 3, 2020 (15 pages).

* cited by examiner

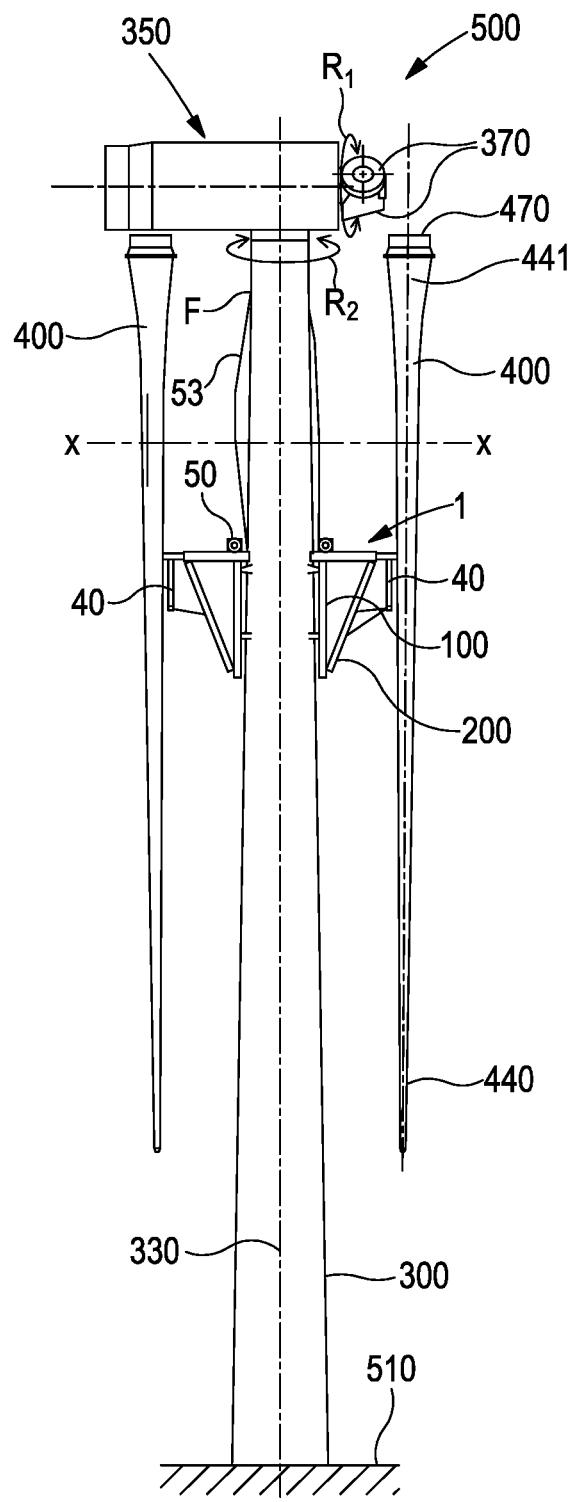
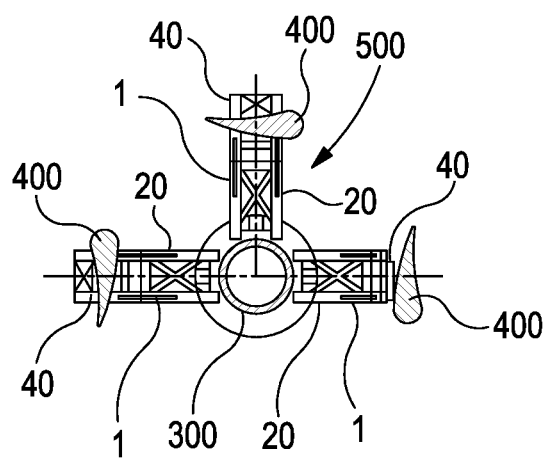
FIG. 3
X-X
FIG. 4

TOOL, INSTALLATION ASSEMBLY, AND METHOD FOR POSITIONING A WIND TURBINE BLADE

CROSS-REFERENCE TO RELATED APPLICATIONS

This application is a 35 U.S.C. § 371 national stage application of PCT/NO2019/050084, filed Apr. 12, 2019, which claims the benefit of Norwegian Patent Application No. 20180521, filed Apr. 16, 2018, the entire contents of each being hereby incorporated herein by reference in their entirety for all purposes.

The present disclosure relates to the field of wind turbines, and in particular, to the installation of blades for wind turbines. Wind turbines today typically have a rotatable hub with blades connected to the hub at or adjacent a top end of a tower. In some projects, it can be convenient to transport some of these components in a disassembled condition to the intended site for installation of the wind turbine.

At the site, the blades for example may need to be connected to the hub (often termed a "nacelle"). The blades may need to be connected so as to be placed at the correct pitch to allow the blades and hub to be turned by the wind. This can require end connectors of the blades to be aligned accurately against corresponding connectors of the rotatable hub.

Such positioning of a blade relative to the hub can be challenging, at least because each blade is generally a large, heavy, and/or cumbersome object. In prior art solutions, cranes have been employed at the site to lift the blade into the correct position for allowing connection to the hub. Attention in the wind turbine industry has also recently turned toward offshore wind turbines. At offshore sites, the provision of cranes to assist in installation of blades may typically require dedicated crane barges and/or specialist vessels to be commissioned which can be inconvenient and costly. In addition, waves, currents, and/or wind in the offshore environment can exacerbate difficulties in handling and positioning blades using cranes.

It can be appreciated that while it may be convenient to transport components in disassembled condition, the practicality and/or efficiency of assembling the components when at the site can be a competing consideration. Prior solutions for transporting components and installing wind turbines can lack practicality and efficiency.

SUMMARY OF THE DISCLOSURE

An aim of the disclosure is to obviate or at least mitigate one or more drawbacks of prior art.

According to a first aspect of the disclosure, there is provided a tool for positioning a blade for a wind turbine for facilitating installation of the blade, the wind turbine including a tower and a rotatable hub on or adjacent to an upper end of the tower, the tool con-figured to be mounted on a side of the tower for supporting the blade on the tower, the tool comprising at least one part and at least one other part, wherein the one part is arranged to be angularly movable relative to the other part for tilting the blade with respect to the tower, to position the blade.

The one part may be further arranged to be both angularly movable and linearly translatable relative to the other part. The linear translatability may comprise linear translation in a first direction for moving the blade along the tower. The linear translatability may comprise linear translation in a second direction. The second direction may be different, e.g. orthogonal to the first direction.

The one part may comprise a mount for the blade. The mount may comprise a gripping device. The mount may be arranged to bear against the blade. The mount may comprise a gripping device for gripping the blade for attaching the blade to the tool.

The other part may comprise a support which may be configured to be fixedly connected to the tower.

The tool may further comprise a positioner which may include the one part. The positioner may include the other part. Alternatively, the positioner may not include the other part. The positioner may be movable e.g. translatable with respect to the other part.

The tool may further comprise first, second, third, fourth parts, which may be movably coupled to one another. In such embodiments, the one part may be the fourth part, the other part may be the first part, and the second and third parts may be parts for movably coupling between the first and second parts.

In embodiments where the tool comprises first, second, third, and fourth parts, either or both of the second and third parts may be movable relative to the fourth part, e.g., for moving the blade radially with respect to the tower and/or tilting the blade for modifying an angle between a longitudinal axis of the blade and a longitudinal axis of the tower. The fourth part may be coupled to the third part by a pivot and may be rotatable relative to the third part about the pivot for changing an angle between them. Either or both of the third and fourth parts may be linearly movable relative to either or both of the first and second parts for moving the blade radially with respect to the tower. The second part may be linearly movable relative to the first part for translating the second, third and fourth parts along the tower.

The tool may further comprise at least one actuator for driving the movement between the one part and the other part. The actuator may comprise at least one linear extender.

The support may comprise a locking device for connecting and locking the other part of the tool fixedly to the tower. The locking device may be releasable from the tower by remote operation, e.g. after use of the tool.

The tool may further comprise a winch which may comprise a flexible elongate member having an end configured to be attached to the tower or other part of the wind turbine. The elongate flexible member, e.g. a winch wire, may be spoolable from a drum of the winch for lowering the tool from the tower after use.

According to a second aspect of the disclosure, there is provided an installation assembly for a wind turbine comprising: a tower; a rotatable hub on an upper end of the tower; at least one blade for the wind turbine; and at least one tool mounted on a side of the tower, the tool supporting the blade on the tower and comprising at least one part which is angularly movable with respect to at least one other part to tilt the blade relative to the tower to position the blade.

According to a third aspect of the disclosure, there is provided a method of installing at least one blade for a wind turbine, the method comprising the steps of: providing a tool comprising at least one part which is angularly movable relative to at least one other part, the tool mounted on a side of an upright tower for the wind turbine, a rotatable hub provided on an upper end of the tower, the blade attached to the tool and supported on the tower via the tool; and operating at least one actuator to produce relative angular movement between the one part and the other part of the tool to position the blade in an installation position.

In another aspect, there is provided a tool for positioning a blade for a wind turbine for facilitating installation of the blade, the wind turbine including a tower and a rotatable hub on an upper end of the tower, the tool configured to be mounted on a side of the tower for supporting the blade on the tower, the tool comprising at least one part movable relative to at least one other part to position the blade with respect to the tower.

In another aspect, there is provided a tool for positioning a blade for a wind turbine for facilitating installation of the blade, the wind turbine including a tower and a rotatable hub on an upper end of the tower, the tool configured to be mounted on a side of the tower for supporting the blade on the tower, the tool comprising at least one part which is movably coupled to at least one other part for tilting the blade with respect to the tower to position the blade. Parts may be movably coupled for producing or obtaining relative angular movement therebetween, e.g. angular movement of the one part relative to the other part.

Various exemplary embodiments of apparatus and methods are described herein, and a particular embodiment may include further features as described in relation to any other embodiment. In other words, features described with respect to one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Various features or advantages of the embodiments of the disclosure are described and will be apparent from the specification throughout.

BRIEF DESCRIPTION OF THE DRAWINGS

There will now be described, by way of example only, exemplary embodiments of the disclosure with reference to the accompanying drawings, in which:

FIG. 3 is a side-view representation of a tower for the wind turbine with the tool of FIG. 1 arranged on the tower;

FIG. 4 is a cross-sectional representation along the line X-X of FIG. 3;

DETAILED DESCRIPTION OF THE DISCLOSED EXEMPLARY EMBODIMENTS

Figure 2:
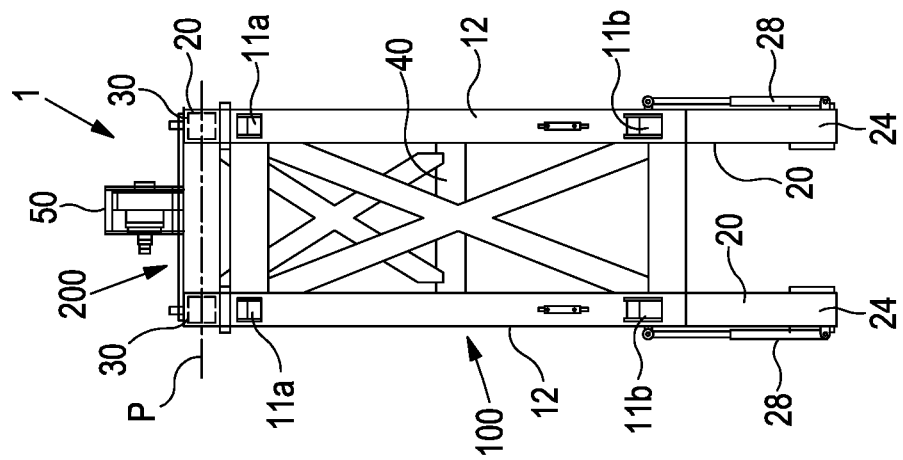
FIG. 2 is rear-view representation of the tool of FIG. 1.
Figure 1:
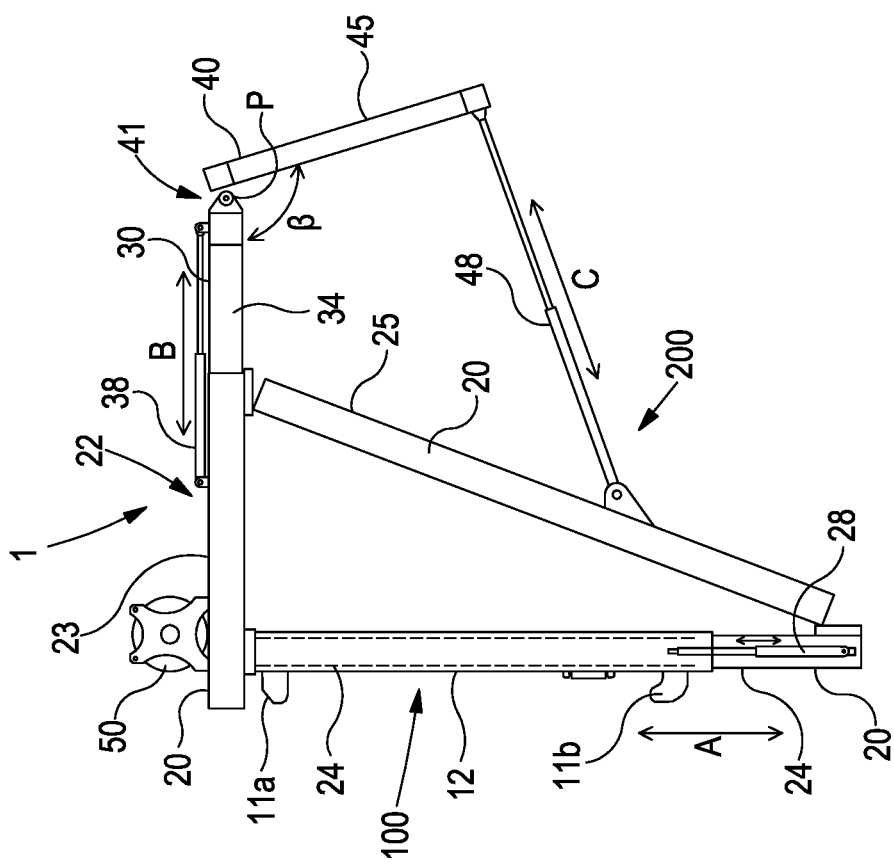
FIG. 1 is side-view representation of a tool for installing a blade for a wind turbine according to a first embodiment of the disclosure.

Referring first to FIGS. 1 and 2, there is generally depicted a tool 1 for positioning a wind turbine blade.

The tool 1 is attachable to an outside of a wind turbine tower, and operates to modify its extent or configuration between the wind turbine tower and the blade, so that the blade can be moved with respect to the tower and positioned appropriately to allow connection of the blade to a hub supported at an upper end of the tower.

The tool has a structure including a number of coupled parts which are movable relative to one another. The parts are coupled, as will be described further in the following, so as to produce movement of at least one of the parts with respect to the tower, when mounted thereto, in directions vertically along the tower, laterally away from the side of the tower, and rotationally about a horizontal axis.

This functionality of movement may be embodied in various ways. In the present example, such parts include a support 100 and a positioner 200.

The support 100 ("first part") is arranged to be fixed rigidly to the side of the tower. The support 100 includes a frame 12 with connectors 11a, 11b that fix the frame 12 and tool in place on the side of the tower in a desired location along the tower. (When on the tower and the tower is upright, the tool is arranged as shown in the orientation of the figure.)

The positioner 200 is movably coupled to the support 100. The positioner 200 as a whole is movable with respect to the support 100, whilst still supported there-upon. The positioner 200 includes individual parts which are movably interconnected, the parts including a main body 20 ("second part"), an extender member 30 ("third part"), and a mount 40 ("fourth part"). The wind turbine blade is attached to the mount 40, by suitable means such as described further below. These inter-connected parts then combine under operation for obtaining a position and orientation of the mount 40 to facilitate bringing the attached wind turbine blade into the desired alignment for connection to the hub.

The main body 20 has a frame 22 including a platform section 23, slider section 24, and a stay 25 connected in a triangular formation. As can be appreciated from FIG. 1, the slider section 24 comprises a vertical column, and the platform 23 comprises a beam extending from an upper end of the column of the slider 24 orthogonally away from the column toward a far end. The stay 25 connects between the column and the beam of the respective slider section 24 and platform 23, by reaching away from the lower end of the slider section at an angle to the column to join the beam at its far end. Thus, the platform 23 projects laterally away from the support 100 in FIGS. 1 and 2.

The slider section 24 engages with the frame of the support 100. Furthermore, the slider section 24 is slidably received within a section of the frame 12 of the support 100, so that the section 24 is movable with respect to the frame 12 as indicated by arrow A. More specifically, the slider section 24 comprises a rod that extends, from a lower end to an upper end, through a tubular section of the frame 22 of the support 100. In this way, the main body 20 is securely coupled to the support 100.

The frame of the main body 20 provides therefore a solid and robust structure which can transfer and distribute the loads from the wind turbine blade onto the tower.

An actuator 28 is provided for driving movement of the main body 20 with respect to the support 100. The actuator 28 is a linear actuator which can extend or re-tract in the direction of movement indicated by arrow A. One part of the actuator 28 is fixed to the frame 12 of the support 100, and another part of the actuator 28 is fixed to the frame 22 of the main body 20. Thus, by operating the actuator 28 the two parts of the actuator 28 are moved relative to one another, producing relative movement between the support 100 and the main body 20 whereby the slider section 24 slidably moves upward along the inside of the frame 12. In this example, by shortening the length of the actuator 28, the main body 20 is driven upward with respect to the support 100. The amount of upward movement is determined by the amount of attainable shortening of the actuator.

Turning now to consider the extender body 30, it can also be seen in FIGS. 1 and 2 that the extender body is movably coupled to the main body 20. The ex-tender body 30 is movable relative to the main body 20 as indicated by the arrow B. The extender body 30 comprises a slider section 34 which is arranged to slide and extend out from the frame 20. By doing so, the spacing of the mount 40 away from the support 100 can be adjusted. An actuator 38 is provided for moving the extender body 30 with respect to the main body 20. The actuator 38 is a linear actuator with direction of extension and/or retraction in direction B. The extender body 30 is movable linearly from the main body 20 using the actuator 38. One part of the actuator 38 engages the frame 22 and another part of the actuator 38 engages the slider section 34. By lengthening or shortening the actuator 38, the extender body 30 is moved laterally with respect to the main body 20. The amount of lateral movement is determined by the amount of attainable lateral movement of the actuator.

The mount 40 is movably coupled to the extender body 30. More specifically, the mount 40 is coupled to the extender body 30 via a pivot 41, and can be moved rotationally about a horizontal axis P at the pivot 41 so as to change the angle β. The rotational movement of the mount 40 relative to the extender 30 is facilitated by the actuator 48 which is a linear actuator with direction indicated by arrow C having a part which is connected to the stay 25 and a part connected to the mount 40. The rotational movement (and amount of rotation), of the mount 40 relative to the extender body 30 at the pivot 41, is also controlled through the movement of the extender body 34 relative to the main body 20 (using the actuator 38). The actuators 38 and 48 may thus cooperate to produce desired rotation of the mount and/or lateral translation of the mount 40, according to requirements. By applying linear extension or retraction differentially between actuators 38 and 48, rotation of the mount 40 may be imparted.

The mount 40 in this example has a surface 45 against which the blade may bear against in use, and which can be manipulated by the positioner 200 for positioning the turbine blade. By rotation about the pivot 41, thereby changing the angle (3, the surface 45 is tilted about the horizontal axis P.

Turning now to FIGS. 3 and 4, there is generally depicted an installation assembly 500 for a wind turbine using the tool 1 as described in relation to FIGS. 1 and 2.

The assembly 500 includes a tower 300 for the wind turbine and a rotatable hub 350 at the top end of the tower 300 to which wind turbine blades 400 are to be attached. The hub is rotatable about the axis 330 of the tower. The tower 300 is arranged in upright configuration extending vertically upward from an installation surface, e.g. the ground, deck, or other foundation 510.

The tool 1 is mounted on the tower 300 and the blade 400 is attached to the mount 40, so as to be supported by the tool on the tower. The tool 1 is positioned between the side of the tower 300 and the blade 400, supporting the blade 400 so that the blade is arranged alongside the tower and spaced away from the tower by the tool 1. In FIGS. 3 and 4, the surface 45 of the mount 40 is approximately vertical so that the blade 400, which is held against the surface 45 by a gripping arrangement (not shown), is aligned along the mast in an initial configuration. In this configuration, a central longitudinal axis 440 of the blade 400, or an axis 441 normal to a connection face 470 at an end of the blade 400, is vertical and parallel with the central longitudinal axis 330 of the tower 300.

The blades 400 are typically arranged on the tower 300 using the tool 1 in this configuration also during transport to the installation site and/or before the tower is erected as seen in FIG. 3. The tool 1 is thus typically mounted on the tower 300 and the blades 400 attached to the tool 1 with the tower lying horizontally.

Figure 5:
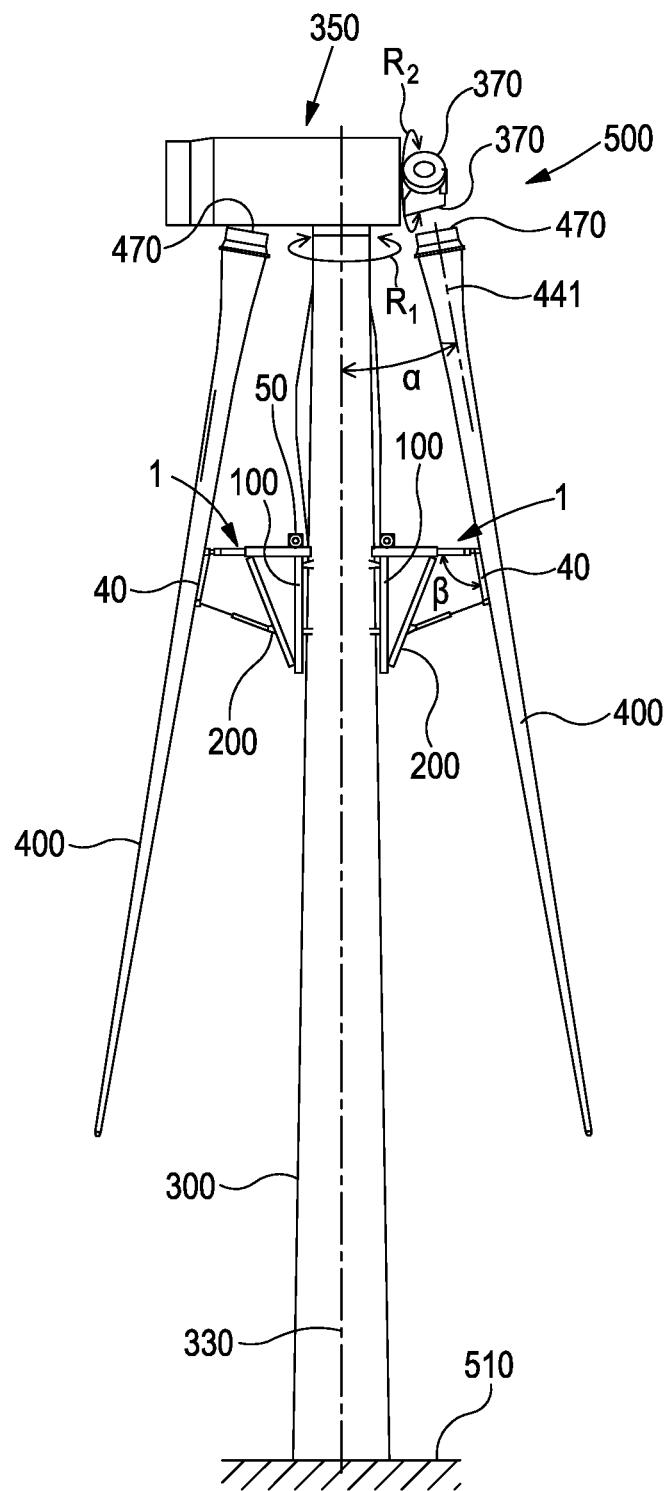
FIG. 5 is a side-view representation of the tower of FIG. 3, where the tool is activated to position the blade for installation.

In FIG. 5, the installation assembly 500 is shown at a later point in time, where the tool 1 operates using the various actuators 28, 38, 48 to move the blade 400 with respect to the tower toward an installation position. In this configuration, the extender body 30 has moved laterally out of the main body 20, away from the side of the tower, and the mount 40 has pivoted outwardly about the horizontal axis P to open and increase the angle θ further. This tilts the blade 400 which is attached to the mount 40 so that the blade tip is moved away from the tower and the connecting, root end of the blade is moved toward the tower 300. The connecting end with the connection face 470 is brought toward alignment for attaching the blade to the hub 350. As can be seen, in this configuration of FIG. 5, the blade is positioned such that the axis 441 is arranged at an acute angle α with respect to vertical and/or a defined longitudinal axis of the tower.

In order to attach the blade, full alignment of the connection end of the blade with the hub is typically required in a predetermined installation position. For example, the connecting face 470 of the blade may be required to be positioned parallel with a corresponding connecting face 370 of the hub 350. The face 470 of the blade may also need to be brought into sufficiently close proximity to the corresponding face 370 to allow connections to be made.

The tool in FIG. 5 is shown before the actuator 28 is used to move the positioner 200 upward. The positioner 200 may be moved upward along the tower in a further step to bring the end of the blade closer toward the hub.

It can also be appreciated that during the installation process, one blade 400 is attached at a time (using the tool). After one blade is attached, the attached blade is then moved out of the way by rotating the nose portion of the hub 350 about a horizontal axis as indicated by arrow R2. The hub 350 is then rotated with respect to the tower 300 about a vertical axis as indicated by arrow R1 to position a next connector 370 of the hub above the end of the next blade to be connected. The tool 1 which supports the next blade is then utilized in the same way to position it in correct alignment to allow it to be connected the next connector of the hub 350.

It can be noted that the tool 1 carries a winch 50 which is tethered by winch wire 53 to the tower 300 at a location F above. After the blade 400 has been attached, the support 100 can be disconnected by remote operation of the connectors 11a, 11b, (for example, by electric or hydraulic deactivation), leaving the tool 1 tethered to the tower by the winch wire 53. The winch can then be operated to spool out the wire 53 from the winch 50 to lower the tool 1 downward along the tower to retrieve it. The winch is supported on the main body 20.

Operation of the actuators may be electric, hydraulic, mechanical, or combinations thereof. The connectors may be activated by hydraulic or electric control to apply sufficient connecting force to solidly connect the support 100 to the tower 300 and supporting the blade 400 in use. As seen in various figures, the connectors 11a, 11b can engage against a corresponding lug, groove, notch, or other formation on surface of the side of the tower.

Figure 6:
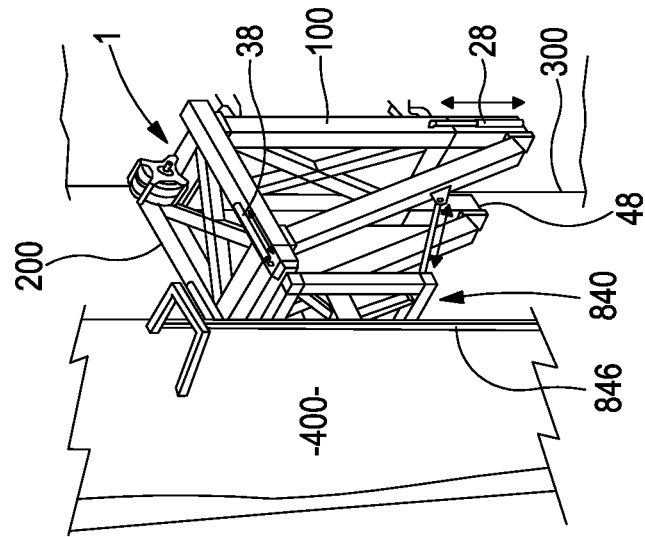
FIG. 6 is a perspective view of the tool of FIG. 1 in use for positioning the blade with respect to a tower for the wind turbine according to another embodiment, where the blade is shown in a first position.
Figure 7:
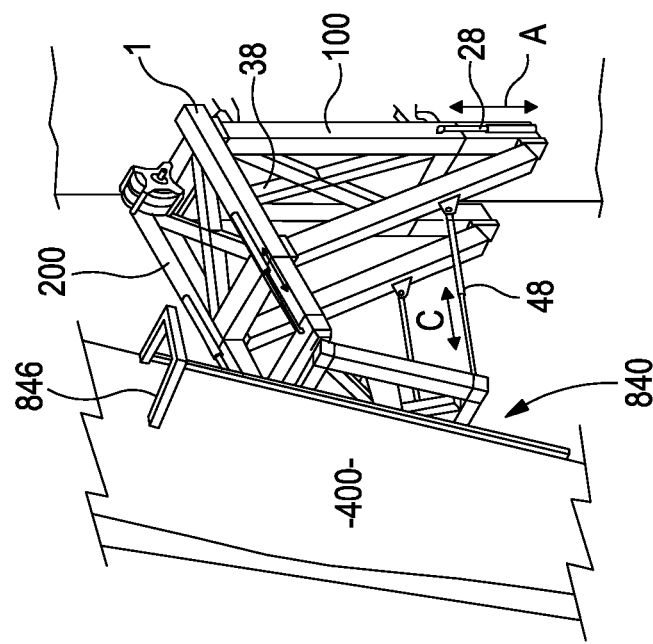
FIG. 7 is a perspective view of the tool in use in the embodiment of FIG. 6, where the blade is shown in a second position.

In FIGS. 6 and 7, the manner in which the tool 1 may be employed in operational use to engage with the tool and position it into the installation position can be appreciated further. In particular, the tool 1 in FIGS. 6 and 7 has a modified mount 840 which includes a gripping device 846 for gripping onto the blade 400.

In use, the positioner 200 is operated to provide movement relative to the support 100 and the tower 300 for aligning the blade 400 in the installation position. The actuators 38 and 48 are used for generating linear movement of the mount 40, 840 laterally away from the tower 300, and rotational movement of the mount about a horizontal axis. The actuator 28 is used for generating linear movement of the mount 40, 840 (and the positioner as a whole) along the tower 300.

It will be appreciated from the foregoing that the positioner 200 may take other forms in other variants of those particularly described, yet still provide corresponding movability with respect to the support 100 to position and align the blade appropriately for attachment to the hub. For example, a scissor structure could be employed. In other variants, for example, angular movement for tilting the blade may be obtained by an angular coupling between parts proximal to the tower, e.g. between the support and the main body 20, while upward translational movement may be achieved by parts distal from the tower, e.g. between the main body and the mount. The support 100 may also take other forms. The tool 1 is described is implemented using linear actuators, and framework capable of taking and transferring structural loads effectively. This can facilitate efficient and robust installation and alignment procedure for the installation of wind turbines.

Various modifications and improvements may be made without departing from the scope of the invention, the invention being defined by the claims that are set out below, and the scope including all equivalents to the claims.

The invention claimed is:

1. A tool for positioning a blade for a wind turbine for facilitating installation of the blade, the wind turbine including a tower and a rotatable hub on the tower, the tool configured to be mounted on the tower for supporting the blade on the tower, the tool comprising:
a support to be fixedly attached to the tower;
a positioner which is movably coupled to the support and is translatable linearly, along the tower in use, relative to the support,
the positioner having a main body and a mount for the blade,
wherein the main body is arranged to be linearly translatable relative to the support for translating the positioner and moving the blade along the tower in use, and
wherein the mount is arranged to be angularly movable relative to the main body for tilting the blade with respect to the tower in use;
at least one linear actuator for driving the linear translation of the main body relative to the support; and
at least one linear actuator for driving the angular movement of the mount relative to the main body;
wherein the linear translatability of the positioner along the tower in use is linear translatability in a first direction, and the positioner further comprises an extender body which is movably coupled to the main body for translating the mount relative to the main body in a second direction, away from the tower in use, wherein the second direction is orthogonal to the first direction.

2. A tool as claimed in claim 1, wherein the main body comprises a frame which is movably coupled to the support and is slidably translatable relative to the support for translating the positioner and moving the blade along the tower in use.

3. A tool as claimed in claim 1, wherein the linear actuator for driving the linear translation of the main body relative to the support has a first end connected to the support and a second end connected to the main body.

4. A tool as claimed in claim 1, wherein the linear actuator for driving the angular movement of the mount relative to the main body has a first end connected to the main body and a second end connected to the mount.

5. A tool as claimed in claim 1, wherein the mount comprises a gripper for gripping the blade.

6. A tool as claimed in claim 1, wherein the support comprises a locking device for connecting and locking the support fixedly to the tower, the locking device comprising a portion extending from the fame and configured to releasable engage a lug, groove, notch or other formation on the surface of the tower.

7. A tool as claimed in claim 6, wherein the locking device is releasable from the tower by remote operation after use of the tool.

8. A tool as claimed in claim 1, further comprising a winch comprising a flexible elongate member having an end configured to be attached to the tower or other part of the wind turbine and being spoolable from a drum of the winch for lowering the tool from the tower after use.

9. An installation assembly for a wind turbine comprising:
a tower;
a rotatable hub on the tower;
at least one blade for the wind turbine; and
at least one tool as claimed in claim 1, mounted on a side of the tower by fixed connection of the support to the tower, the tool supporting the blade on the tower.

10. A tool as claimed in claim 1, wherein the translation of the mount relative to the main body in the second direction away from the tower is independent of the angular movability of the mount relative to the main body for tilting the blade with respect to the tower.

11. A tool as claimed in claim 10, wherein the linear translatability of the positioner along the tower in the first direction is independent of the translation of the mount relative to the main body in the second direction away from the tower, and further independent of the angular movability of the mount relative to the main body for tilting the blade with respect to the tower.

12. A method of installing at least one blade for a wind turbine, the method comprising the steps of:
providing a tool as claimed in claim 1, the tool mounted on a side of an upright tower for the wind turbine by fixed connection of the support to the tower, a rotatable hub provided on the tower, the blade attached to the tool and supported on the tower via the tool; and
operating the at least one linear actuator to produce the relative angular movement between the mount and the main body of the positioner to position the blade in an installation position;
further operating the at least one linear actuator to produce the linear translation of the main body relative to the support for moving the positioner and the blade along the tower to position the blade in the installation position.

* * * * *